United States Patent [19]
Mimata

[11] Patent Number: 6,070,146
[45] Date of Patent: May 30, 2000

[54] TICKET ISSUING SYSTEM, TICKET CHECKING SYSTEM, CHECK SYSTEM, RETRIEVING SYSTEM AND AUTOMATIC EXAMINATION MACHINE

[75] Inventor: Yoshinobu Mimata, Nishinomiya, Japan

[73] Assignee: Kabushiki Kaisha Toshiba, Kawasaki, Japan

[21] Appl. No.: 09/033,485

[22] Filed: Mar. 3, 1998

[30] Foreign Application Priority Data

Mar. 3, 1997 [JP] Japan .................................. 9-048235

[51] Int. Cl.⁷ .................................................. G07B 15/02
[52] U.S. Cl. .......................... 705/13; 235/382; 235/384; 232/7; 232/18
[58] Field of Search ............................... 705/13; 346/15; 235/382, 31 R, 31 T, 384; 232/7, 18

[56] References Cited

U.S. PATENT DOCUMENTS

| | | | |
|---|---|---|---|
| 4,758,954 | 7/1988 | Takiguchi | 705/13 |
| 4,822,990 | 4/1989 | Tamada et al. | 235/492 |
| 4,984,170 | 1/1991 | Hirahara | 705/13 |
| 5,191,195 | 3/1993 | Aubrey | 235/384 |
| 5,382,781 | 1/1995 | Inoue | 235/384 |
| 5,397,883 | 3/1995 | Miyashita | 235/382 |
| 5,414,249 | 5/1995 | Matsumoto | 235/384 |
| 5,450,051 | 9/1995 | Stromberg | 235/384 |
| 5,471,203 | 11/1995 | Sasaki et al. | 235/382 |
| 5,498,860 | 3/1996 | Ohno et al. | 235/384 |
| 5,514,857 | 5/1996 | Corless | 235/384 |
| 5,661,286 | 8/1997 | Fujioka | 235/384 |
| 5,740,369 | 4/1998 | Yokozawa et al. | 235/384 |
| 5,831,547 | 11/1998 | Ohtsuki et al. | 235/384 |

OTHER PUBLICATIONS

Naoyuki et al, "ID System—Remote Coupling Card with Non–Battery and High Speed Communication for Non–Touch Automatic Gate. Power Transfer and Communication", Omron Tech, vol. 33 No. 4, pp. 303–307, Fig. 7, Dialog File 94:JICST–EPlus, 1993.

Miller, Luther S., "AFC: A Fare Deal For All, (Mass Transit Automatic Fare Collection Systems)", Railway Age, v195, n5, p. 61(3), Dialog File 148:Trade & Industry Database, May 1994.

Matsukawa et al, "Automatic Passenger Gate System Using Wireless IC Card", Vehicle, Road & Traffic Intelligence Society, vol. 4, p. 1567, Dialog File 63:Transport Res-(TRIS), 1995.

Block, Valerie, "Transit Agencies Pioneer Payment Devices. (New Card Applications)", American Banker, v160, n175, p. 5A(2), Dialog File 148:Trade & Industry Database, Sep. 1995.

Koichi et al, "Information System. New Passenger Information System Using Contactless IC Cards", Railway Technical Research Institute Report, vol. 10, No. 4, pp. 41–46, Fig. 5, Dialog File 94:JICST–EPlus, 1996.

Primary Examiner—Emanuel Todd Voeltz
Assistant Examiner—John W. Hayes
Attorney, Agent, or Firm—Pillsbury Madison & Sutro LLP

[57] ABSTRACT

The server, which has the preliminarily stored customer data file, issues a radio card by employing the radio card issuing machine, reads out a customer name from the radio card presented to the automatic ticket examination machine at the entrance, retrieves the customer name in the customer data file, permits entrance when the customer name is retrieved, displays the entrance of the customer on the monitor in a department (area) corresponding to the retrieved customer, and outputs it from the printer.

9 Claims, 16 Drawing Sheets

FIG. 11A

| ID CODE | JUDGMENT OF AUTOMATIC TICKET EXAMINATION MACHINE | PROCESSING OF RETRIEVING DEVICE |
|---|---|---|
| 1~40 | NORMAL CARD | DISPLAY HISTORY OF USAGE |
| 41~50 | ERROR CARD | DISPLAY NOT FOUND! |

FIG. 11B

| | ENTRANCE AND EXIT DATA (RAILWAY SECTIONS) | PARE |
|---|---|---|
| 1 | TOKYO~SHIBAURA | FARE OF RAILWAY SECTION (ACCORD WITH LCD DISPLAY) |
| 2 | TOKYO~ASHITA | |
| 3 | TOKYO~TOKYO | |
| 4 | OSAKA~TOKYO | |
| 5 | HONOLULU~KITASHIBA | |
| 6 | SEOUL~KITASHIBA | |
| 7 | NEW TORK~NISHISHIBA | |
| 8 | LONDON~KITASHIBA | |
| 9 | LOSANGELS~NISHISHIBA | |
| 10 | ROME~NISHISHIBA | |

| ID CODES | NAMES |
|---|---|
| 1 | TARO TOKYO |
| 2 | HANAKO TOKYO |
| 3 | ICHITARO TOKYO (CHILD) |
| 4 | AKIKO TOKYO |
| 5 | TEPPEI TOKYO |
| 6 | JUNPEI TOKYO |
| 7 | HARUMI TOKYO |
| 8 | MEGUMI TOKYO (CHILD) |
| 9 | HIKARU TOKYO (CHILD) |
| 10 | MISATO TOKYO (CHILD) |
| 11 | KEIKO TOKYO |
| 12 | NATSUMI TOKYO |
| 13 | KEISUKE TOKYO |
| 14 | HIROFUMI TOKYO |
| 15 | MAKOTO TOKYO |
| 16 | HIROSHI TOKYO |
| 17 | DAISUKE TOKYO |
| 18 | AYA TOKYO |
| 19 | HIDEYO TOKYO |
| 20 | TETSUYA TOKYO |

FIG. 12A

| ID CODES | NAMES |
|---|---|
| 21 | ART TOKYO |
| 22 | DOME TOKYO |
| 23 | ATOM TOKYO |
| 24 | PEGASUS TOKYO |
| 25 | SUBARU TOKYO |
| 26 | GRECO TOKYO |
| 27 | WATARI TOKYO |
| 28 | JUN TOKYO |
| 29 | MAGMA TOKYO |
| 30 | TENJI TOKYO |
| 31 | SMART TOKYO |
| 32 | LORAN TOKYO |
| 33 | WHITE TOKYO |
| 34 | SMAILE TOKYO |
| 35 | MECCA TOKYO |
| 36 | GROSS TOKYO |
| 37 | GLOBAL TOKYO |
| 38 | ATENA TOKYO |
| 39 | CIAO TOKYO |
| 40 | ROBIN TOKYO |

FIG. 12B

| OPERATIONS | R/W→ PC TRANSMISSION DATA | CRT DISPLAY |
|---|---|---|
| 1. PLACE RADIO CARD | ID CODE TRANSMITTED | DISPLAY TURNED ON |
| 〜 KEEP PLACING | 〜 ID CODE NOT TRANSMITTED | DISPLAY CONTINUED |
| 〜 REMOVE RADIO CARD | 〜 END DATA TRANSMITTED | DISPLAY TURNED OFF |
| 2. PLACE AGAIN RADIO CARD (AND OTHER CARDS SIMILARLY) REPEAT THE SAME OPERATIONS | ID CODE TRANSMITTED | DISPLAY TURNED ON |

☆ ☆ ☆ USAGE INFORMATION ☆ ☆ ☆

9999 99 99

USER NAME: □□□□□□□□□ □
ID (CLOSE TO LEFT)

TIME       Am/Pm 99:99~Am/Pm 99:00
NAME       TICKET
SECTION    TOKYO→SHIBAURA
PAYMENT    ¥200
INQUIRY NUMBER  No. 9999999999

THANK YOU

PF1: HISTORY OF USAGE

FIG. 15

☆ ☆ ☆ ☆ ☆ HISTORY OF USAGE ☆ ☆ ☆ ☆ ☆

9999 99 99    USER NAME: ☐☐☐☐☐☐☐☐☐☐    ID

| COUNT | TIME ENTRANCE-EXIT | NAME | SECTION_PAYMENT (¥) | | INQUIRY NUMBER |
|---|---|---|---|---|---|
| 1 | Am 08:10~Am 08:50 | TICKET | TOKYO→SHIBAURA | 200 | 0000000001 |
| 2 | Am 99:99~Am 99:99 | TICKET | TOKYO→SHIBAURA | 200 | 9999999999 |
| 3 | | | | | |
| 4 | | | | | |
| 5 | | | | | |
| 6 | | | | | |
| --- | | | | | |

CONTINUE TO NEXT PAGE

PF2: PRINTER OUTPUT OF THE DATE    PF3: PRINTER OUTPUT OF TOTAL USAGES    PF4: PREVIOUS PAGE    PF5: NEXT PAGE

DETAILED STATEMENT OF THE DATE     1977 02 07

1
TARO TOKYO

| 5 | Am 05:00~Am 05:02 | TICKET | TOSHIBA~KITASHIBA | 500 | 31 |
| 6 | Am 06:00~Am 06:02 | TICKET | KYOTO~TOKYO | 600 | 32 |
| 7 | Am 07:00~Am 07:02 | TICKET | TOKYO~SHIBAURA | 700 | 34 |

FIG. 17

DETAILED STATEMENT OF TOTAL USAGES 1977 02 07

1
TARO TOKYO

| | | | | | |
|---|---|---|---|---|---|
| 1 | 1997/01/01 | Am 01:00~Am 01:02 | TICKET | TOKYO~SHIBAURA | 100 | 24 |
| 2 | 1997/11/11 | Am 02:00~Am 02:02 | TICKET | TOSHIBA~KITASHIBA | 200 | 27 |
| 3 | 1997/01/19 | Am 03:00~Am 03:02 | TICKET | KYOTO~TOKYO | 300 | 29 |
| 4 | 1997/01/20 | Am 04:00~Am 04:02 | TICKET | TOKYO~SHIBAURA | 400 | 30 |
| 5 | 1997/02/07 | Am 05:00~Am 05:02 | TICKET | TOSHIBA~KITASHIBA | 500 | 31 |
| 6 | | Am 06:00~Am 06:02 | TICKET | KYOTO~TOKYO | 600 | 32 |
| 7 | | Am 07:00~Am 07:02 | TICKET | TOKYO~SHIBAURA | 700 | 34 |
| 8 | 1997/08/08 | Am 08:00~Am 08:02 | TICKET | TOSHIBA~KITASHIBA | 800 | 35 |
| 9 | 1997/02/09 | Am 09:00~Am 09:02 | TICKET | LOS ANGELS~TOKYO | 900 | 36 |

TICKET ISSUING SYSTEM, TICKET CHECKING SYSTEM, CHECK SYSTEM, RETRIEVING SYSTEM AND AUTOMATIC EXAMINATION MACHINE

BACKGROUND OF THE INVENTION

1. Field of Invention

The present invention relates to a ticket examination system having automatic ticket examination machines installed at entrances and exits of, for example, railway stations or facilities or the like to examine customers' tickets, and a retrieving device, a display device and an automatic ticket examination machine.

2. Description of Related Art

There have been conventional automatic ticket examination machines provided at entrances and exits of railway stations (or facilities) in order to automate the examination of tickets and save labor for the examination.

Recently introduced are automatic ticket examination machines, each allowing passengers to expose (bring close in a distance in which the radio communication can be carried out) radio cards (information recording mediums) which the passengers carry to an exposure portion (hereinafter referred to as only an exposure portion) provided with an antenna when they entrance and exit the stations or change trains at the stations, in order to receive and read information data recorded on the radio cards. The machines check the information data, and permit the passengers to pass through the entrances or exits if the data is proper or prohibit them from passing therethrough if the data is improper.

However, they are employed to judge whether entrance to the system and exit therefrom is permitted or not at railway stations, and passengers could not recognize their own history of usage since the information of the date when the radio cards are used or the detailed history of the usage could not be retrieved.

BRIEF SUMMARY OF THE INVENTION

The present invention aims at providing a retrieving system which allow the information of the date when information storing mediums are used or detailed history of the usage to be retrieved.

The present invention also aims at providing a thicket issuing system and a ticket checking system and a check system which can make proper reception for passengers by recognizing who enters the system and allowing it to be displayed.

According to a first aspect of the invention, there is provided a retrieving system for storing processing data of a checking device for checking passage of a customer holding an information storing medium storing identification data, the retrieving system comprising:

storage means for storing information about a plurality of customers including identification data;

recording means for recording the processing data of the information storing medium checked by the checking device, in association with the corresponding customer information in the storage means;

reading means for reading the identification data from the information storing medium;

retrieving means for retrieving the customer's information in the storage means, with reference to the identification data read by the reading means; and display means for displaying the customer's information including the processing data recorded by the recording means, retrieved by the retrieving means.

According to a second aspect of the invention, there is provided a ticket issuing system for issuing a information storing medium, comprising:

first input means for inputting customer's information including customer's name;

storing means for storing the information about a plurality of customers which is inputted by the first input means;

second input means for inputting the customer's name to issue the information storing medium;

retrieving means for retrieving the customer information stored in the storing means on the basis of the customer's name inputted by the second input means;

issuing means for issuing the information storing medium based on the retrieved customer information when the retrieving means retrieves the customer information; and display means for displaying that no customer information is found when the retrieving means cannot retrieved the customer information.

According to a third aspect of the invention, there is provided a ticket checking system for checking an information storing medium carried by a customer, the information storing medium storing name data used to identify the customer's name and an expiration date of validity, comprising:

storage means for storing information about a plurality of customers including customer's name;

reading means for reading the name data and the expiration date of validity stored by the information storing medium;

determination means for determining whether the information storing medium is valid or not with reference to the expiration date of validity which is read by the reading means;

retrieving means for retrieving the customer information stored in the storage means with reference to the name data which is read by the reading means, when the information storing medium is determined valid by the determination means; and control means for controlling the permission of passage of the customer when the customer information can be retrieved by the retrieving means.

According to a fourth aspect of the invention, there is provided a ticket checking system for controlling customer's passage holding an information storing medium which stores identification data and an expiration data of validity, comprising:

storage means for storing information about a plurality of customers including customer's name in every department and storing them;

a plurality of display devices provided for respective departments classified by the storage means;

reading means for reading identification data and the expiration date of validity stored an the information storing medium;

determination means for determining whether the information storing medium is valid or not with reference to the expiration date of validity read by the reading means;

retrieving means for retrieving the customer information stored in the storage means with reference to the identification data read by the reading means, when the information storing medium is determined valid by the determination means;

control means for controlling the permission of passage of the customer when the customer information is retrieved by the retrieving means;

judging means for judging to which department the customer information is classified, when the customer information is retrieved by the retrieving means; and display control means for allowing to be displayed on the display device in the department corresponding to the customer information, of the plurality of display devices, with reference to the judgment made by the judging means.

According to a fifth aspect of the invention, there is provided a ticket checking system for checking a passage of a customer holding an information storing medium which stores identification data and an expiration date of validity, comprising:

first storage means for storing information about a plurality of customers including data used to identify a customer;

first reading means provided at an entrance of the system, for reading the identification data and the expiration date of validity stored the information storing medium;

determination means for determining whether the information storing medium is valid or not with reference to the expiration date of validity read by the first reading means;

retrieving means for retrieving the customer information from the first storage means corresponding to the identification data read by the first reading means;

control means for permitting passage of the customer when the information storing medium is determined valid by the determination means and when the customer information is retrieved by the retrieving means;

second storage means for storing an entrance time at which the customer has passed through the entrance together with the identification data, when the control means permits the passage of the customer;

second reading means provided at an exit entrance of the system, for reading the identification data from the information storing medium;

third storage means for storing an exit time at which the customer has passed through the exit together with the identification data, when the second reading means reads the identification data;

calculating means for calculating a residence period from the entrance of the customer to the exit thereof, with reference to the entrance time and exit time stored in the second storage means and the third storage means; and recording means for adding the residence period calculated by the calculating means to the customer information including the identification data.

According to a sixth aspect of the invention, there is provided an automatic examination machine for examining a medium carried by a customer and the medium electrically connected to the storage means and storing identification information, the machine comprising:

display means provided on customer's path displaying a permission of the customer's passage;

storage means for storing customer information of an issued medium;

reading means for reading identification information assigned to the information storing medium;

inquiry means for referring to the storage means for the customer information with reference to the identification information read by the reading means; and control means for allowing a passage of the machine and energizing the display means with a first form, when passage is permitted as a result of inquiry about the customer information made by the inquiry means, or intercepting the passage of the machine and energizing the display means with a second form different from the first form, when the passage is prohibited.

According to a seventh aspect of the invention, there is provided a check system constituted by a check device for checking passage of a customer holding an information storing medium which stores data used to identify the customer and an expiration date of validity are recorded, and a retrieving device for retrieving the data processed by the check device and storing the processed data, the system comprising:

storage means provided at the retrieving device, for storing information about a plurality of customers including the data used to identify the customer;

first reading means provided at the check device, for reading the identification data and the expiration date of validity stored in the information storing medium;

judging means provided at the check device, for judging whether the information storing medium is valid or not with reference to the expiration date of validity read from the first reading means;

first retrieving means for retrieving customer information from the customer information stored in the storage means corresponding to the identification data stored in the information storing medium, when the information storing medium is judged valid by the judging means;

first display means for displaying the customer information when the customer information is retrieved by the first retrieving means;

recording means provided at the check device, for adding usage information including a date of usage to the customer information when the customer information is retrieved by the retrieving means;

second display means provided at the check device, for displaying that the customer is prohibited from passing through the check device, when the information storing medium is judged invalid by the judging means or when the customer information is not retrieved by the retrieving means;

second reading means provided at the retrieving device, for reading the identification data from the information storing medium;

second retrieving means for retrieving the customer information from the storage means, with reference to the identification data read by the second reading means; and third display means provided at the retrieving device, for displaying the customer information including the usage information recorded by the recording means, with reference to the customer information retrieved by the second retrieving means.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11A shows record examples of a hard disc;

FIG. 11B shows record examples of a hard disc;

FIG. 12A shows record examples of a hard disc;

FIG. 12B shows record examples of a hard disc;

FIG. 15 shows an example of screen display on a CRT display device;

FIG. 16 shows an example of screen display on a CRT display device;

FIG. 17 shows an example of output from a printer; and

FIG. 18 shows an example of output from the printer.

DETAILED DESCRIPTION OF THE INVENTION

An embodiment of the present invention will be described below with reference to the figures.

Figure 1:
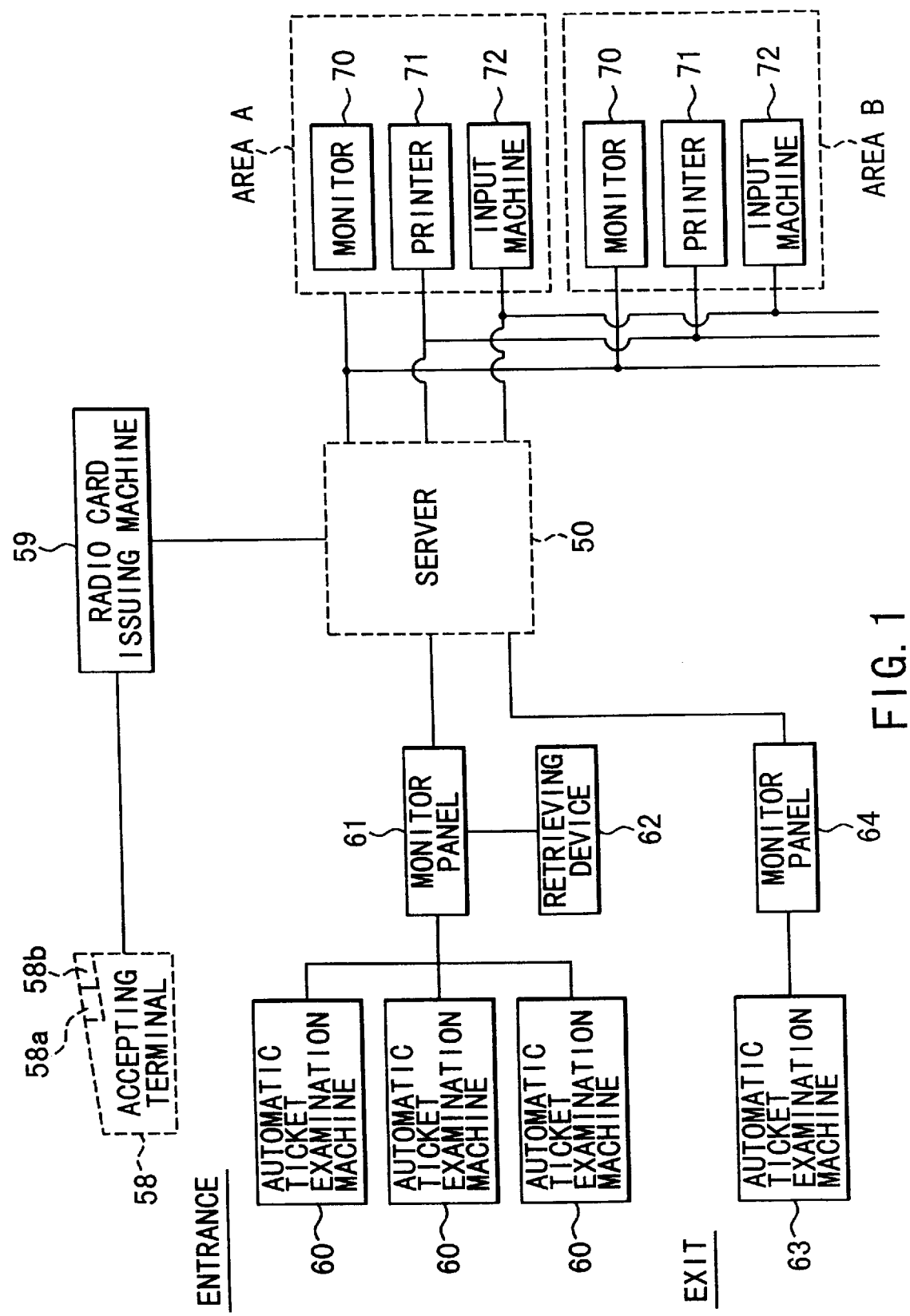
FIG. 1 schematically shows the ticket examination system according to the present invention.

FIG. 1 schematically shows a configuration of the ticket examination system according to the present invention. This ticket examination system is entirely controlled by a server 50. The server 50 is constituted by an accepting terminal 58 having an input section 58a serving as an input means and a display section 58b, and a radio card, a radio card issuing machine 59 for issuing the radio card, automatic ticket examination machines 60 provided at an entrance of facilities, a monitor panel 61 for monitoring the automatic ticket examination machines 60, a retrieving device 62 connected to the monitor panel 61, an automatic ticket examination machine 63 provided at an exit of facilities, a monitor panel 64 for monitoring the automatic ticket examination machine 63, monitors 70 serving as display means provided in respective areas (sections) A, B, . . . of the facilities, printers 71 serving as printing means, and input machines 72. As the facilities, event halls, stations in the railway systems or other systems checking entrance and exit can be cited.

Figure 2:
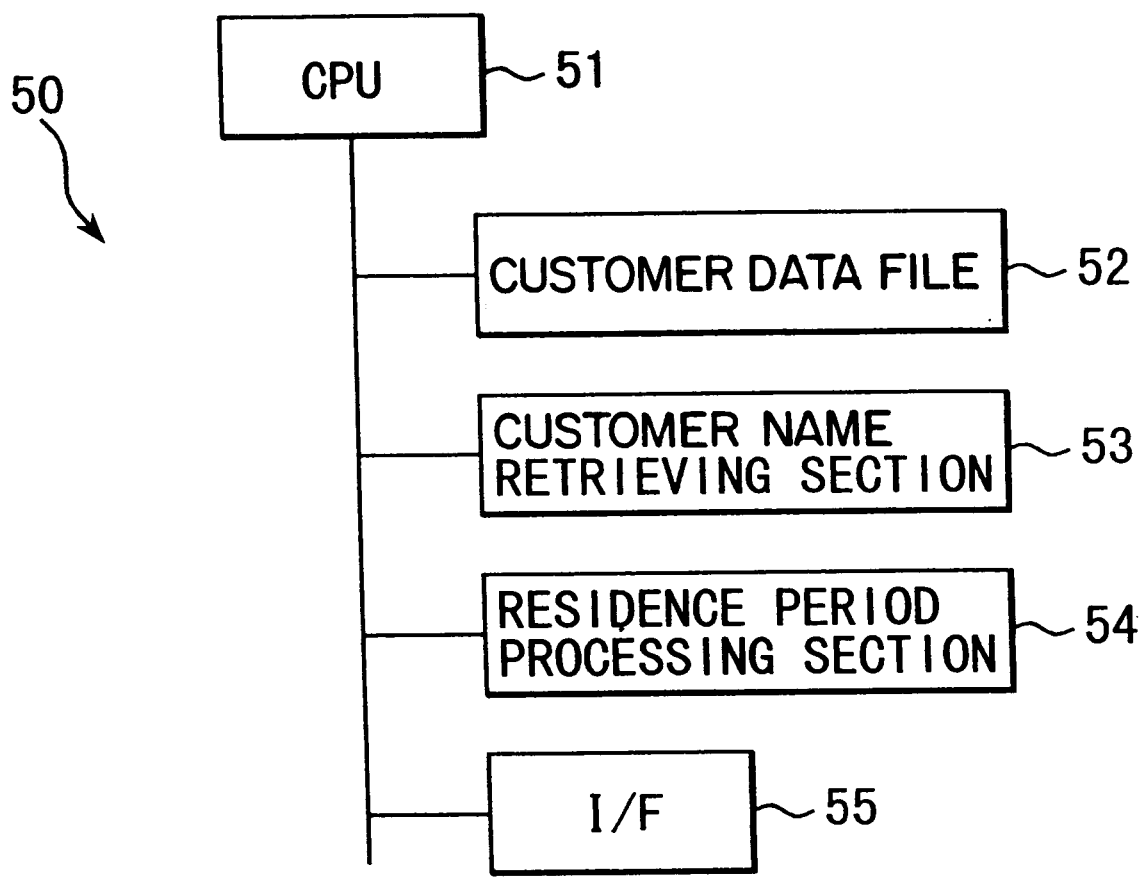
FIG. 2 shows a constitution of a server.

FIG. 2 shows a configuration of the server 50, which is constituted by a CPU 51 for managing the entire control, a customer data file 52 serving as a memory means, a customer name retrieving section 53 serving as a retrieving means, a residence period processing section 54, and an interface (I/F) 55.

FIGS. 3, 4, 5 and 6 schematically show the configuration of the automatic ticket examination machines 60 and 63.

Figure 3:
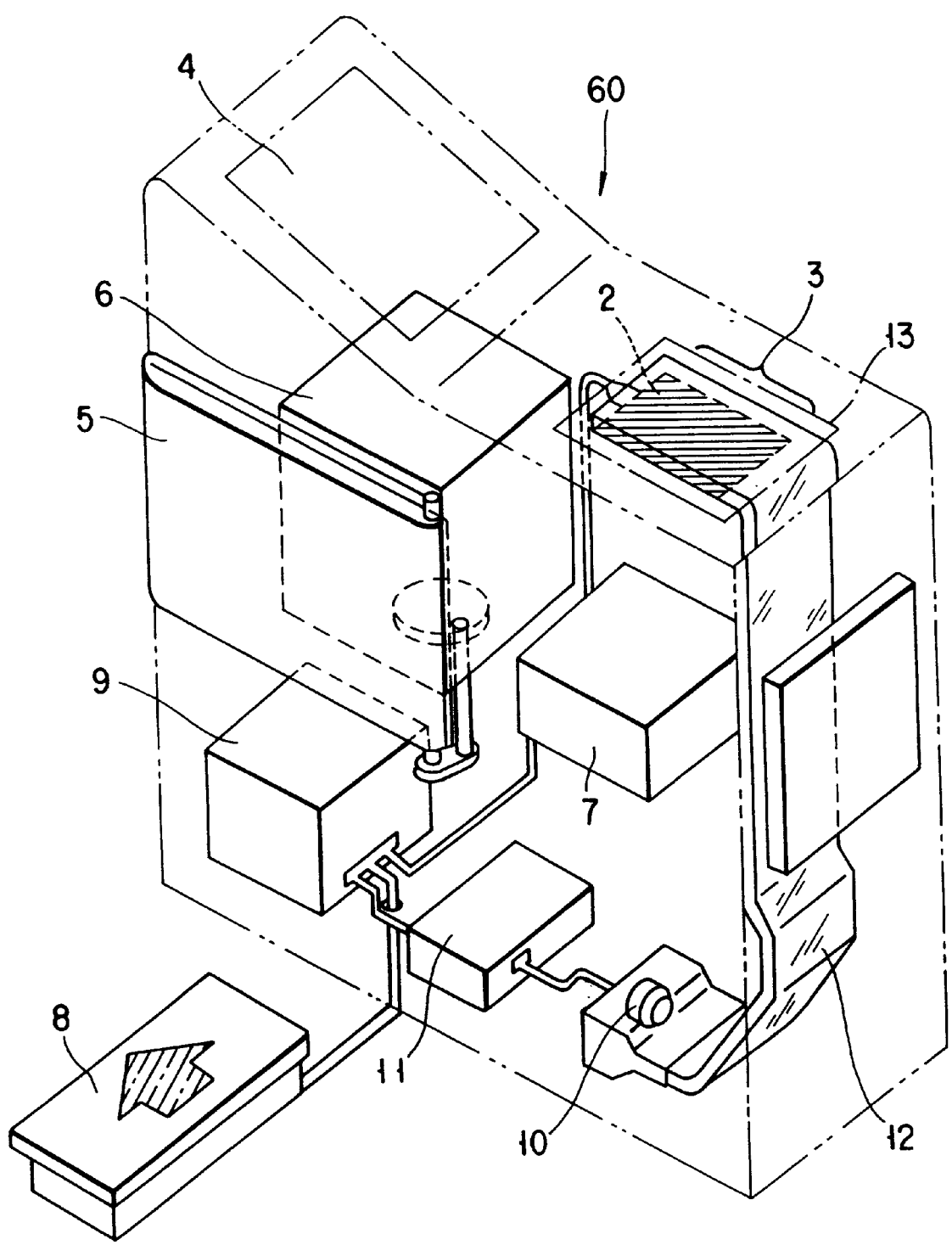
FIG. 3 schematically shows the automatic ticket examination machine.

In FIG. 3, each of the automatic ticket examination machines 60 and 63 is constituted by an antenna presentation section 3 to which the radio card is presented and whose lower surface has an antenna 2 for radio transmission and reception, a display unit 4 for displaying guidance to passengers, a door 5 for prohibit the passengers from passing, a door opening/closing mechanism section 6 for opening/closing the door 5, a radio reader-writer (read means) 7 for executing reading/writing operations by means of the antenna 2, a floor guide section 8 for provided on a floor to display guidance as to whether or not the passengers are permitted to pass, a control section 9 for managing the entire control including a power supply section, a flush control section 11 for controlling a flush light source 10 serving as a light emitting means, a transparent light guide 12 formed of acryl, etc. serving as a light guiding means for guiding light from the flush light source 10, and an illuminating section 13 serving as an illuminating means for illuminating the antenna exposure section 3 with the light guided by the transparent light guide 12.

Figure 4:
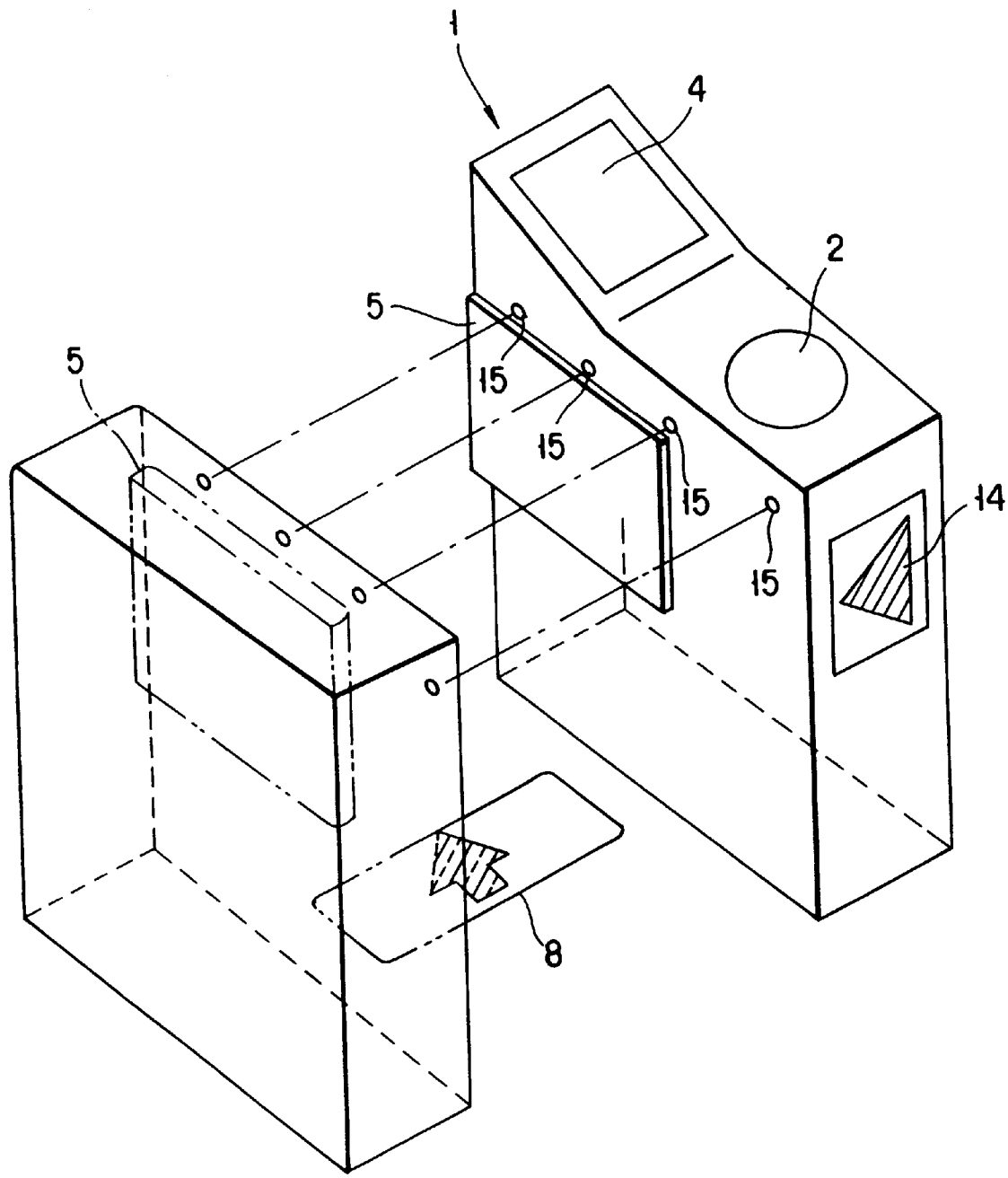
FIG. 4 schematically shows the automatic ticket examination machine.

FIG. 4 shows the outer appearance of the automatic ticket examination machines 60 and 63, and each of them is constituted by the antenna presentation section 3, the display unit 4, the door 5, the floor guidance section 8, a passage guidance display section 14 for guiding the passengers, and a plurality of human body sensors 15 provided at the sides of the automatic ticket examination machines 60 and 63, for sensing human bodies (passengers) which pass beside the automatic ticket examination machines 60 and 63. The human body sensors 15 are constituted by, for example, infra-red sensors or the like.

Figure 5:
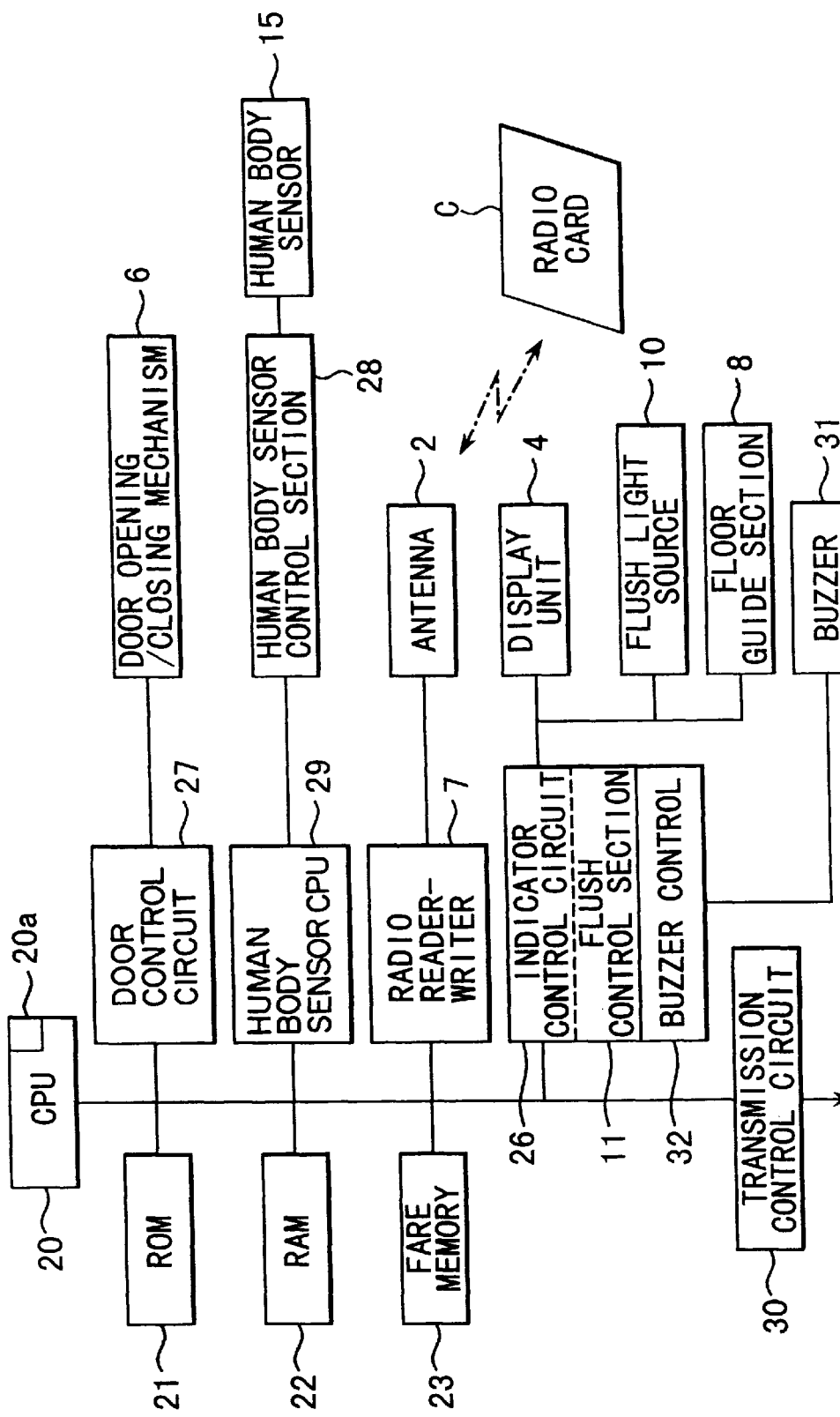
FIG. 5 schematically shows the automatic ticket examination machine.

FIG. 5 shows the configuration of the control system of the automatic ticket examination machines 60 and 63. That is, the control system of each of the automatic ticket examination machines 60 and 63 is constituted by a central processing unit (hereinafter referred to as a CPU) 20 for entirely controlling the automatic ticket examination machines 60 and 63, a read only memory (hereinafter referred to as a ROM) 21 for storing a control program of the CPU 20, a random access memory (hereinafter referred to as a RAM) 22 for storing the information which is read from the radio card, storing a plurality of display patterns which are preliminarily formed so as to be selected, and recording the information as a buffer of the control program, a fare memory 23 for storing fare information corresponding to an entrance station where usage of the ticket (radio card) is started (or an entrance station code corresponding to the entrance station), a radio reader-writer 7 for controlling the radio communication with the radio card C, a display control circuit 26 for controlling the display of the display unit 4 and the floor guidance section 8 in accordance with the transmission and reception with the radio card C, the antenna 2 which even transmits electric power to a batteryless radio card, judgment of the ticket (radio card) and the movement of passengers, a door control circuit 27 for controlling the door opening/closing mechanism 6, a human body sensing control section 28 for sensing passage conditions of the human bodies (passengers) on the basis of the sensing output from the human body sensors 15, a Human Body Sensor CPU 29 for controlling the human body sensing control section 28, and a transmission control circuit 30 for executing the transmission of the information with the control panels 61 and 64 which control the automatic ticket examination machines 60 and 63, respectively.

The CPU 20 has a timer function 20a, etc. The display control circuit 26 includes the flush control section 11 and controls the display operated by the flush light source 10. Further, a buzzer control section 32 for controlling a buzzer 31, which announces the result of determination of the radio card C by sounds, is provided at the display control circuit 26. The buzzer control section 32 controls the buzzer 31 in different manners at the determination to permit the radio card to pass and the determination to prohibit the radio card from passing.

In the present invention, as shown in FIG. 3, the flush light source 10 serving as a light source for determination of permission/prohibition of the radio card is positioned remote from the antenna 2, light is introduced to the illuminating section 13 by the transparent light guide 12 (for optically transmitting light with the transparent material) and the entire surface of the antenna presentation section 3 can be thereby illuminated. As a result, the flush light source 10 does not influence the antenna effect (performance), and the illumination of determination of the presented surface can be confirmed at the same place simultaneously when the passengers present the radio cards C to the antenna presentation section 3.

By employing flush (formed by an xenon tube) as the light source, a sufficient quantity of light can be obtained, and also, the illumination response to the processing speed can be adequately made by instantaneously emitting light.

The flush operation is generally submitted to the time limit of the flush interval in accordance with the charging time. The flush interval is generally practically sufficient within 0.5 seconds and can actually be realized at approximately 0.3 seconds since light emission needs only to be processed in accordance with the running speed of a human body.

Visible recognition corresponding to the running and moving condition of passengers can be provided by illuminating the antenna presentation section 3 having the antenna 2 in accordance with the determination of permission/prohibition of the passage and simultaneously displaying the determination with the floor guide section 8 provided on the floor surface along the proceeding direction of passengers. In addition, convenience such as safety can be maintained by visibly recognizing the operation of the door 5.

In this structure, the antenna 2 provided immediately under the antenna presentation section 3 of the automatic ticket examination machines 60 and 63 is not influenced by electric circuit components or noise, a sufficient quantity of light can be obtained from all over the surface of the antenna presentation section 3 by introducing light to the illuminating section 13 by means of the transparent light guide 12, it is not limited where the light source can be provided, the response speed becomes high, and the guidance for passengers can be conveniently displayed by the floor guide section 8.

As shown in FIG. 3, the transparent light guide 12 or, for example, a transparent acrylic plate, which is processed to allow light to be irregularly reflected on an area equivalent to the light emitting surface, is provided at the antenna exposure section 3 corresponding to the immediate upper surface of the antenna 2. The transparent acrylic plate extends to the flush light source 10, and can obtain a sufficient quantity of light by collecting the light emitted from the flush light source 10. According to this structure, the light source for illuminating the antenna exposure section 3 can be disposed with freedom inside the automatic ticket examination machines 60 and 63, which can remarkably reduce the influence given to the radio communication by the electric circuit components relating to the illumination.

Further, as for the floor guide section 8 for displaying the result of determination about permission/prohibition of the passage to the passengers, an LED dot matrix or a liquid crystal display (LED) is provided under the floor, and the display area portion of the floor section is constituted by a transparent material, so as to display a green arrow when the permission of passage is determined or a red advance prohibition mark when the prohibition of passage is determined. The floor guide section 8 serving as the display means is provided at a position below the door 5 which passengers can easily watch.

By the way, as is well known, in the flush operation, if a voltage of more than approximately 220 V is applied in advance between main electrodes and a pulse voltage (trigger) of some thousands of volts is applied to an auxiliary voltage (a trigger voltage), a current instantaneously flows between the main electrodes so as to emit light.

Figure 6:
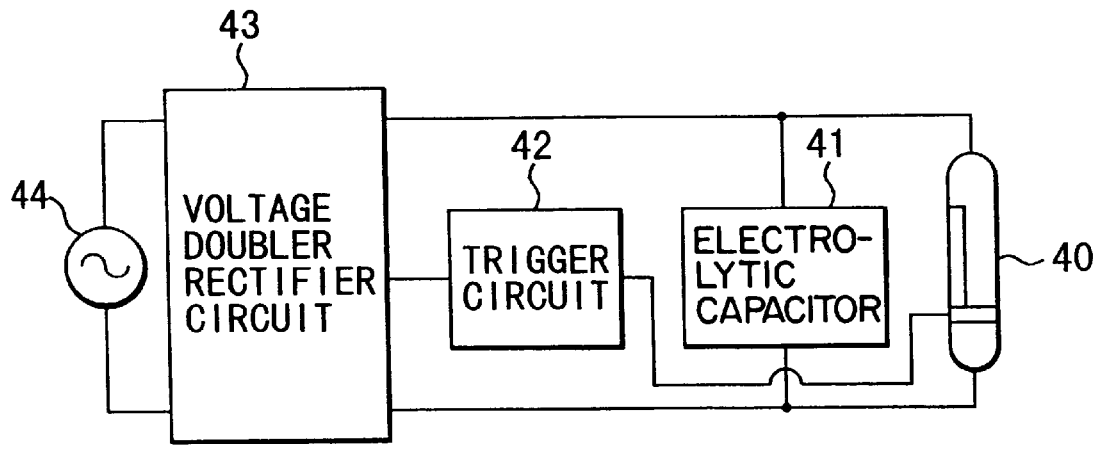
FIG. 6 schematically shows the automatic ticket examination machine.

FIG. 6 shows an example of a circuit for emitting the light of the flush light source 10. That is, an electrolytic capacitor 41, a trigger circuit 42, a voltage doubler rectifier circuit 43 and a power supply 44 are connected to a xenon discharge tube 40 serving as the flush light source 10.

As shown in FIG. 6, generally, a DC voltage of the voltage doubler rectifier circuit 43 is applied between the main electrodes of the xenon discharge tube 40 and, at the same time, accumulated in advance in the electrolytic capacitor 41. On the other hand, a trigger signal of thousands of volts is produced in the trigger circuit 42 and added to a trigger electrode of the xenon discharge tube 40 to allow light to be instantaneously emitted from the xenon discharge tube 40. A next light emission interval is required in accordance with a time to accumulate electricity in the electrolytic capacitor 41, and the xenon discharge tube 40 thereby blinks.

Figure 7:
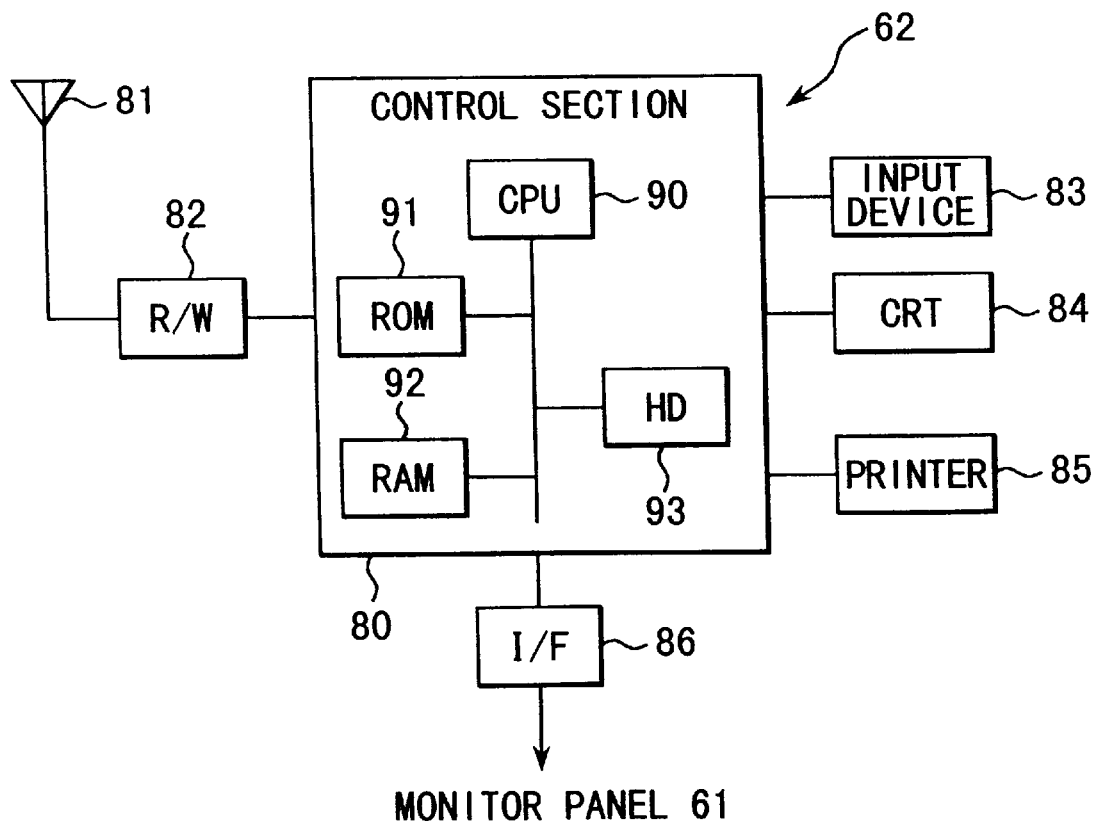
FIG. 7 is a block diagram schematically showing a configuration of the retrieving device.

FIG. 7 schematically shows a configuration of the retrieving device 62 of the present invention. The retrieving device 62 is constituted by a control section 80 for managing the entire control, an antenna 81 employed for radio communication with the radio cards C, a read writer (reading means) 82, an input device 83, a CRT display device 84 serving as a display means, a printer 85 serving as a printing means, and an interface (I/F) 86 connected to the monitor panel 61. The control section 80 is constituted by a CPU 90, a ROM 91 for storing control programs, a RAM 92 for storing various data items, and a hard disc (HD) 93 serving as a memory means for storing customer data items, etc.

Figure 8:
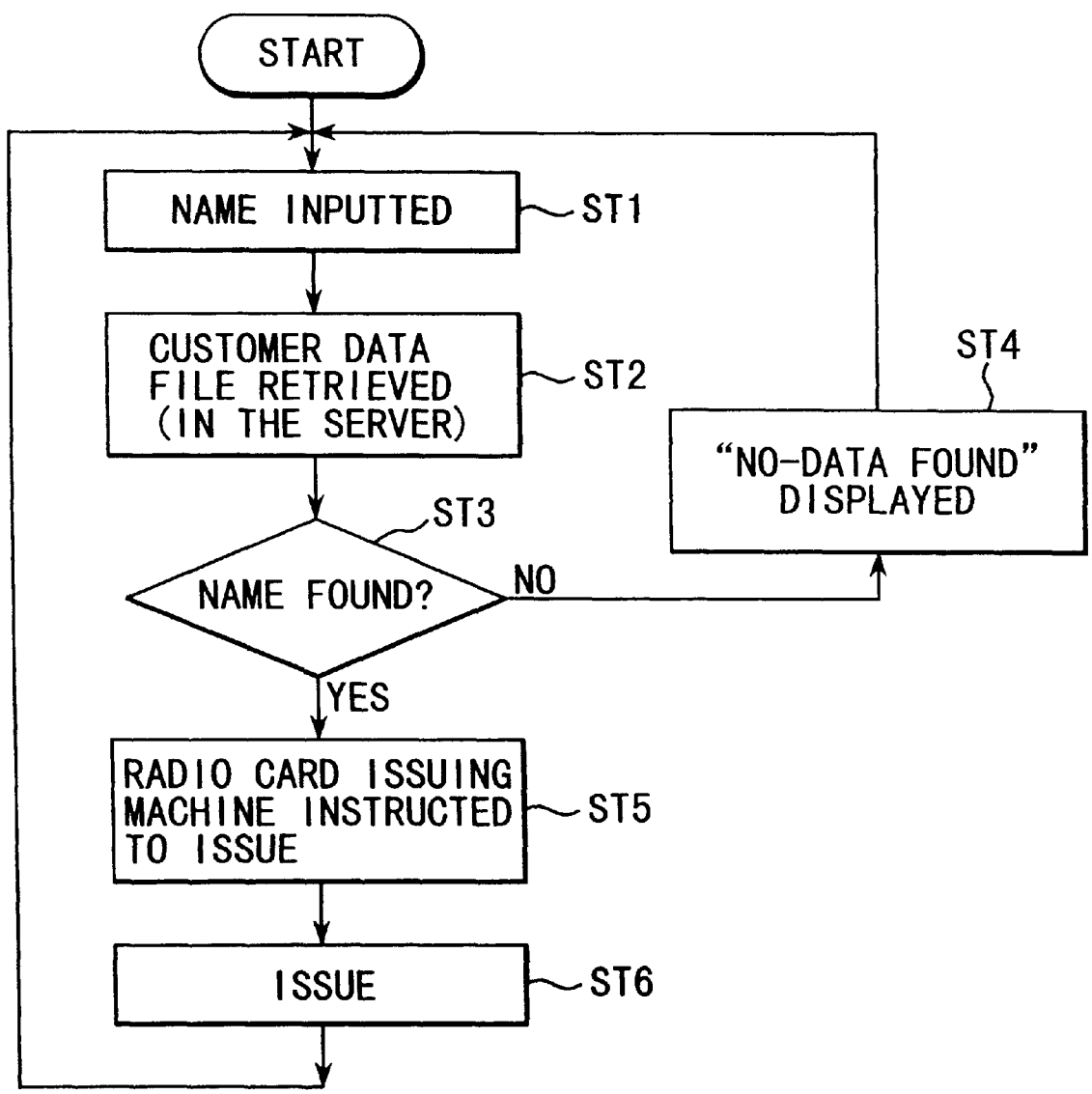
FIG. 8 is a flow chart explaining operations of issuing radio cards.

Next, issuing operations of the radio cards C in this structure will be described with reference to a flow chart of FIG. 8.

It is assumed that in the present system, the data of a plurality of customers constituted by names, addresses, department names, etc. may be preliminarily input from the input machines 72 in the respective areas (departments) A, B, etc., ID codes corresponding to customer data may be added to the data and they may be stored in customer data file 52 of the server 50.

First, when a name is input from the input section 58a of the accepting terminal 58 to the server 50 (ST1), the CPU 51 of the server 50 receiving the name via the radio card issuing machine 59 retrieves the customer names in the customer data file 52 by employing the customer name retrieving section 53 (ST2).

If the input name is not found (ST3), the CPU 51 displays "no-data found" on the display section 58b of the accepting terminal 58 via the radio card issuing machine 59 (ST4).

If the input name is found (ST3), the CPU 51 instructs the radio card issuing machine 59 to issue the radio card C (ST5), and an expiration date of validity, a name of an issuing agency and an ID code which are available for the name are assigned to the input name by the radio card issuing machine 59 and the radio card C is issued (ST6).

Figure 9:
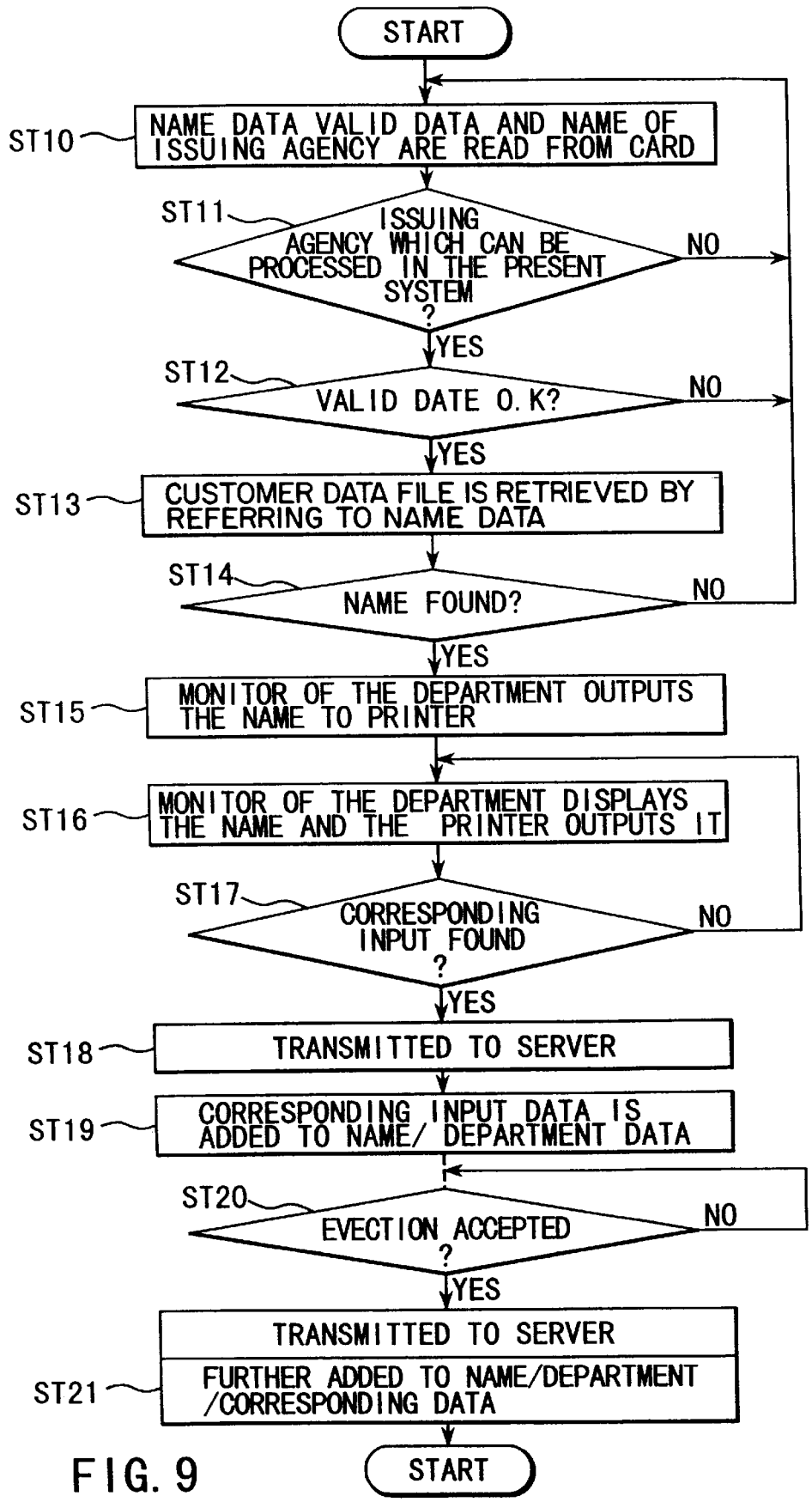
FIG. 9 is a flow chart explaining entrance and exit operations by radio cards.

Next, entrance and exit operations made by the radio card C will be described with reference to a flow chart of FIG. 9.

First, when the radio card C is exposed to the antenna exposure section 3 of the automatic ticket examination machine 60 at the entrance, the CPU 20 reads name data, data about the expiration date of validity and the name of the issuing agency recorded on the radio card C via the antenna 2 and the radio reader-writer 7 (ST10), and judges whether the radio card C was issued by the issuing agency which can be processed by the present system (ST11). If it is judged that the radio card C was issued by the issuing agency which can be processed by the present system, the CPU 20 determines whether the expiration date of validity comes after the present date (of usage) or not (ST12). If the expiration date of validity comes before the date of usage, the CPU 20 displays the guidance of prohibition of passage on the display unit 4 and also on the floor guide section 8, turns on the buzzer 31 to make a buzz indicating the prohibition of passage, and closes the door 5 by the door opening/closing mechanism 6.

If the expiration date of validity comes after the date of usage (or on the date of usage), the CPU 20 transmits the name data to the server 50 via the control panel 61. The CPU 51 of the server 50 retrieves the customer names in the customer data file 52 by employing the customer name retrieving section 53 with reference to the transmitted name data (ST13). If the name is not found (ST14), the CPU 51 transmits information of "no name found" to the CPU 20. The CPU 20 displays the guidance of prohibition of passage on the display unit 4 and also on the floor guide section 8, turns on the buzzer 31 to make a buzz indicating the prohibition of passage, and closes the door 5 by the door opening/closing mechanism 6.

If the corresponding name is found, the CPU 51 determines the area (department) with reference to the customer data, displays the name on the monitor 70 of the area including the name data (area A or B, etc.) and outputs it from the printer 71 (ST15, 16). The CPU 51 also transmits the information of "the name found" to the CPU 20. The CPU 20 displays the guidance of permission of passage on the display unit 4 and also on the floor guide section 8, turns on the buzzer 31 to make a buzz indicating the permission of passage, and opens the door 5 by the door opening/closing mechanism 6.

For employees standing by in a corresponding department, it is possible to be informed of presence of visitors from the display of the monitor 70 and the output of the printer 71 and thereby smartly receive the visitors. If input corresponding to the display output is output from the input machine 72 of the corresponding department (ST17), the corresponding input is transmitted to the server 50 (ST18). The CPU 51 adds the transmitted corresponding input data to name/department data of the customer data file 52 (ST19).

After that, when the radio card C is exposed to the antenna exposure section 3 of the automatic ticket examination machine 63 at the entrance, the CPU 20 receives the ID code and the name data from the radio card C via the antenna 2 and the radio reader-writer 7 and accepts ejection of the radio card C (ST20). The CPU 20 transmits the exit data including the exit time at which the ejection has been accepted to the server 50 via the control panel 61. The CPU 51 of the server 50 adds the transmitted exit data to the name/department/corresponding data of the customer data file 52 (ST21), and finishes the operations.

By allowing the ejection of the radio card C to be accepted at the automatic ticket examination machine 63 of the exit, the CPU 51 of the server 50 can form data of a residence period of customers with reference to the entrance information and the exit data, and can store it in the customer data file 52.

Moreover, for a customer who does not carry his radio card with him, it is possible to issue a radio card quickly by retrieving the customer data file 52 of the server 50 with the radio card issuing machine 59 connected directly to the accepting terminal 58.

Next, the operations of the retrieving device 62 of the present invention shown in FIG. 7 will be described.

The retrieving device 62 adds a sequence number and an inquiry number of every reception, for each ID code, to the data received from the automatic ticket examination machines and stores them. The retrieving device 62 receives the ID code, the name, etc. from the radio card C via the antenna 8 and thereby displays the details of usage data of the date when it is used.

Figure 10:
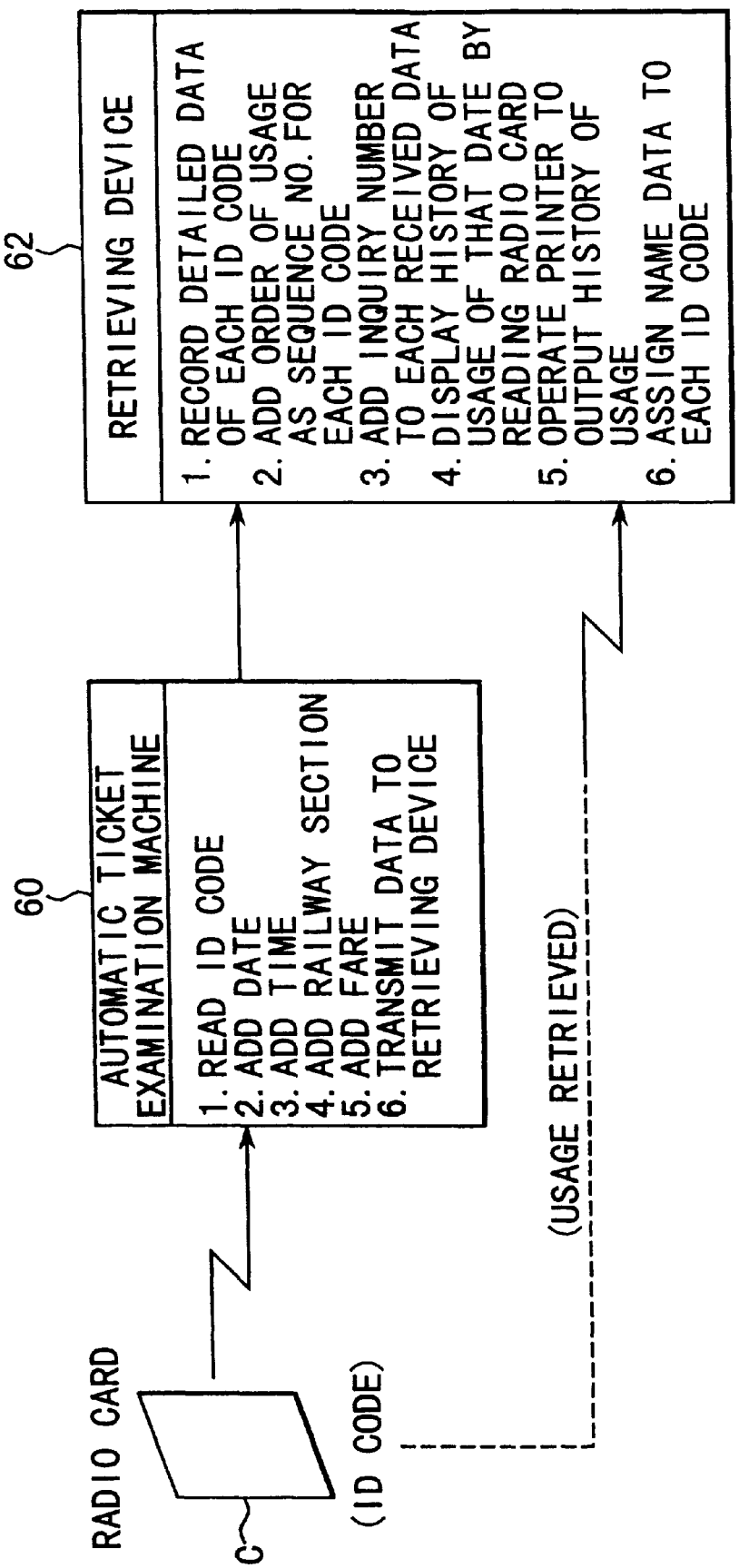
FIG. 10 shows operations of the radio cards, the automatic ticket examination machine and the retrieving device.

FIG. 10 shows operating conditions of the radio card C, the automatic ticket examination machine 60 and the retrieving device 62.

In this figure, when the radio card C is presented to the antenna 2 of the automatic ticket examination device 60 and the name corresponding to the name data of the radio card C is retrieved from the customer data file 52, the automatic ticket examination machine 60 executes addition of the date, addition of the time, addition of railway sections, and addition of the fare, to the ID code which has been read from the radio card C, and transmits these data items to the retrieving device 62. Receiving the transmitted data, the retrieving device 62 executes recording of detailed data for each ID code, addition of a usage sequence as a sequence number for each ID code, addition of an inquiry number for each received data, and display of history of usage of the date when it is used by reading the radio card, and outputs the history of usage from the printer 85 by operating the printer 85 and stores the name data, etc. for each ID code in the hard disc (HD) 93.

The CPU 90 of the retrieving device 62 preliminarily receives the ID codes of the radio cards from the server 50 and stores them in the hard disc 93.

FIGS. 11A, 11B, 12A and 12B show an example of record of the hard disc 93.

In FIG. 11A, if ID codes 1–40 have been already assigned and used for inquiry, the automatic ticket examination machine 60 determines the radio card as a normal card, and the history of usage is displayed on the CRT display device 84 by the retrieving device 62. If ID codes 41–50 have not yet been assigned and used for inquiry, the automatic ticket examination machine 60 determines the radio card as an error card, and "NOT FOUND" is displayed on the CRT display device 84 by the retrieving device 62.

FIG. 11B shows the entrance and exit data (railway sections) of the radio card C and the fare data. The data of railway sections has ten patterns, and the data items are cyclically shifted and selected every time the ID codes of the radio card C are read.

The date when the ticket examination system examines the radio card, and the time when the automatic ticket examination machines 60 and 63 examine the card, are recorded.

FIGS. 12A and 12B show records of the names for respective ID codes. As described above, "TOKYO TARO", "TOKYO HANAKO", "ROBIN TOKYO", etc. are set for ID codes 1, 2, 40, etc., respectively. Names are not set since ID codes 41–50 are not assigned to any names.

Next, display operations of the retrieving device 62 in this structure will be described with reference to FIG. 13.

Figures 13, 14:
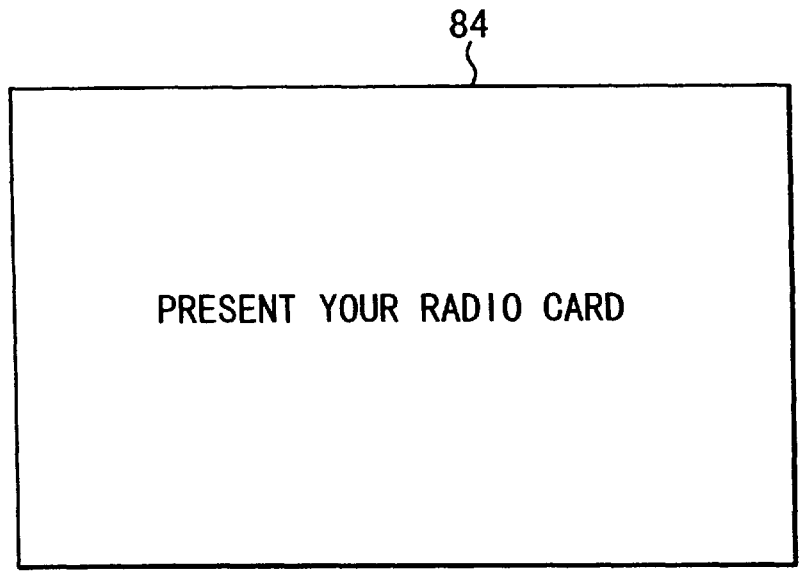
FIG. 13 explains display operations of the retrieving device.
FIG. 14 shows an example of screen display on a CRT display device.

First, the CRT display device 84 in a waiting state displays "PRESENT YOUR RADIO CARD" on its screen as shown in FIG. 14.

When the radio card C is presented to the antenna 81 of the retrieving device 62 or positioned in the vicinity thereof, the reader-writer 82 reads the ID code of the radio card C and transmits it to the control section 80. The CPU 90 of the control section 80 reads out new usage information stored in the hard disc 93 that corresponds to the transmitted ID code and displays it on the CRT display device 84. FIG. 15 shows an example of new usage information displayed on the CRT display device 84.

When a key "PF1" (not shown) of the input device 83 is pushed down, the CPU 90 reads out the detailed history of usage of the date when it is used stored in the hard disc 93 that corresponds to the ID code and displays it on the CRT device 84. FIG. 16 shows an example of the detailed history of usage of the date when it is used displayed on the CRT device 84.

When a key "PF2" (not shown) of the input device 83 is pushed down, the CPU 90 outputs a detailed statement of the date when it is used from the printer 85. FIG. 17 shows an example of the output of a detailed statement of the date when it is used. When a key "PF3" (not shown) of the input device 83 is pushed down, the CPU 90 outputs a detailed statement of total usages from the printer 85. FIG. 18 shows an example of the output of the receipt of totally cumulative usage.

If the radio card remains continuously placed, the reader-writer 82 keeps receiving the same ID code as that of the radio card C. At this time, the CPU 90 of the control section 80 allows the CRT display device 84 to continue the display.

If the radio card C is removed, i.e. if the ID code is not received or different ID code is received, the reader-writer 82 transmits end data to the control section 80, the CPU 90 of the control section 80 turns off the display of the new usage information or the detailed history of usage of the date when it is used on the CRT display device 84, and allows the CRT display device 84 to display again the waiting information shown in FIG. 14.

When the radio card C (or any other card) is presented to the antenna 81 of the retrieving device 62 or positioned in the vicinity thereof, the reader-writer 82 reads the ID code of the radar card C and transmits it to the control section 80. The CPU 90 of the control section 80 reads out the new usage information stored in the hard disc 93 that corresponds to the transmitted ID code, and displays it on the CRT display device 84.

In the display operations of the retrieving device 62, new usage information is displayed when the radio card C is presented to the antenna 81 or positioned in the vicinity thereof. However, it may be displayed when the radio card C is exposed to the antenna 81 or positioned in the vicinity thereof and may not be displayed when the CRT display device 84 is in a waiting state.

Further, in the above embodiment, a radio card is used, but a magnetic card is applicable.

As described above, according to the embodiment of the present invention, the server retrieves the customer name from the name data received by means of the automatic ticket examination machines, permits passage through the automatic ticket examination machines when the customer name is retrieved, and displays the visitor information on the monitor of the department (area) corresponding to the customer and outputs it to the printer, and thereby the customer can be received smartly.

Further, for the customer who does not carry the radio card with him, a radio card can be issued quickly since the customer data is stored in advance.

Moreover, by only presenting the radio card to the retrieving device, new usage information or the detailed history of usage of the date when it is used can be displayed, or output from the printer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A retrieving system for storing processing data of a checking device for checking passage of a customer holding an information storing medium storing identification data, said retrieving system comprising:

storage means for storing information about a plurality of customers including identification data;

recording means for recording the processing data of said information storing medium checked by said checking device, in association with the corresponding customer information in said storage means;

reading means for reading said identification data from said information storing medium;

retrieving means for retrieving said customer's information in said storage means, with reference to said identification data read by said reading means; and display means for displaying said customer's information including the processing data recorded by said recording means, retrieved by said retrieving means, wherein said display means comprises:

means for selectively displaying information of usage of the date and cumulative usage information added to the retrieved customer information; and printing means for selectively printing the information usage of the date and the cumulative usage information displayed by said display means.

2. A retrieving system for storing processing data of a checking device for checking passage of a customer holding an information storing medium storing identification data, said retrieving system comprising:

storage means for storing information about a plurality of customers including identification data;

recording means for recording the processing data of said information storing medium checked by said checking device, in association with the corresponding customer information in said storage means;

reading means for reading said identification data from said information storing medium;

retrieving means for retrieving said customer's information in said storage means, with reference to said identification data read by said reading means; and display means for displaying said customer's information including the processing data recorded by said recording means and retrieved by said retrieving means, said display means further comprising:

first display control means for allowing said display means to continuously display the customer information when the same identification data is received by said reading means; and second display control means for allowing the display of said display means to be finished if said identification data is not received by said reading means during the display of said first display control means.

3. A ticket issuing system for issuing a information storing medium, comprising:

first input means for inputting customer's information including customer's name;

storing means for storing the information about a plurality of customers which is inputted by said first input means;

second input means for inputting the customer's name to issue the information storing medium;

retrieving means for retrieving the customer information stored in said storing means on the basis of the customer's name inputted by said second input means;

issuing means for issuing the information storing medium based on the retrieved customer information when said retrieving means retrieves the customer information; and display means for displaying that no customer information is found when said retrieving means cannot retrieved the customer information.

4. A ticket checking system for checking an information storing medium carried by a customer, the information storing medium storing name data used to identify the customer's name and an expiration date of validity, comprising:

storage means for storing information about a plurality of customers including customer's name;

reading means for reading the name data and the expiration date of validity stored by the information storing medium;

determination means for determining whether the information storing medium is valid or not with reference to the expiration date of validity which is read by said reading means;

retrieving means for retrieving the customer information stored in said storage means with reference to the name data which is read by said reading means, when said information storing medium is determined valid by said determination means; and control means for controlling the permission of passage of the customer when the customer information can be retrieved by said retrieving means;

a display device for displaying the retrieved customer information when the customer information can be retrieved by said retrieving means; and printing means for printing the customer information displayed on said display device.

5. A ticket checking system for controlling customer's passage holding an information storing medium which stores identification data and an expiration data of validity, comprising:

storage means for storing information about a plurality of customers including customer's name in every department and storing them;

a plurality of display devices provided for respective departments classified by said storage means;

reading means for reading identification data and the expiration date of validity stored an said information storing medium;

determination means for determining whether the information storing medium is valid or not with reference to the expiration date of validity read by said reading means;

retrieving means for retrieving the customer information stored in said storage means with reference to the identification data read by said reading means, when said information storing medium is determined valid by said determination means;

control means for controlling the permission of passage of the customer when the customer information is retrieved by said retrieving means;

judging means for judging to which department the customer information is classified, when the customer information is retrieved by said retrieving means; and display control means for allowing the customer information to be displayed on the display device in the department corresponding to the customer information, of said plurality of display devices, with reference to the judgment made by said judging means.

6. The ticket checking system according to claim 5, further comprising input means provided to respectively correspond to said plurality of display devices, for inputting a response indicating that the display of said display devices has been recognized.

7. The ticket checking system according to claim 6, further comprising recording means for adding the response inputted by said input means to the corresponding customer information in said storage means.

8. A ticket checking system for checking a passage of a customer holding an information storing medium which stores identification data and an expiration date of validity, comprising:

first storage means for storing information about a plurality of customers including data used to identify a customer;

first reading means provided at an entrance of the system, for reading the identification data and the expiration date of validity stored said information storing medium;

determination means for determining whether the information storing medium is valid or not with reference to the expiration date of validity read by said first reading means;

retrieving means for retrieving the customer information from said first storage means corresponding to said identification data read by said first reading means;

control means for permitting passage of the customer when the information storing medium is determined valid by said determination means and when the customer information is retrieved by said retrieving means;

second storage means for storing an entrance time at which the customer has passed through the entrance together with said identification data, when said control means permits the passage of the customer;

second reading means provided at an exit entrance of the system, for reading said identification data from said information storing medium;

third storage means for storing an exit time at which the customer has passed through the exit together with said identification data, when said second reading means reads said identification data;

calculating means for calculating a residence period from the entrance of the customer to the exit thereof, with reference to the entrance time and exit time stored in said second storage means and said third storage means; and recording means for adding the residence period calculated by said calculating means to the customer information including the identification data.

9. A check system constituted by a check device for checking passage of a customer holding an information storing medium which stores data used to identify the customer and an expiration date of validity are recorded, and a retrieving device for retrieving the data processed by the check device and storing the processed data, said system comprising:

storage means provided at said retrieving device, for storing information about a plurality of customers including the data used to identify the customer;

first reading means provided at said check device, for reading said identification data and said expiration date of validity stored in said information storing medium;

judging means provided at said check device, for judging whether said information storing medium is valid or not with reference to said expiration date of validity read from said first reading means;

first retrieving means for retrieving customer information from the customer information stored in said storage means corresponding to the identification data stored in the information storing medium, when said information storing medium is judged valid by said judging means;

first display means for displaying the customer information when the customer information is retrieved by said first retrieving means;

recording means provided at said check device, for adding usage information including a date of usage to the customer information when the customer information is retrieved by said retrieving means;

second display means provided at said check device, for displaying that the customer is prohibited from passing through the check device, when said information storing medium is judged invalid by said judging means or when the customer information is not retrieved by said retrieving means;

second reading means provided at said retrieving device, for reading said identification data from said information storing medium;

second retrieving means for retrieving the customer information from said storage means, with reference to said identification data read by said second reading means; and third display means provided at said retrieving device, for displaying said customer information including the usage information recorded by said recording means, with reference to the customer information retrieved by said second retrieving means.

* * * * *